US009418385B1

(12) United States Patent
Wang et al.

(10) Patent No.: US 9,418,385 B1
(45) Date of Patent: *Aug. 16, 2016

(54) ASSEMBLING A TAX-INFORMATION DATA STRUCTURE

(75) Inventors: Gang Wang, San Diego, CA (US); Jay J. Yu, Encinitas, CA (US); Thac S. Pham, Irvine, CA (US); Gerald B. Huff, Berkeley, CA (US); Per-Kristian G. Halvorsen, Los Altos Hills, CA (US)

(73) Assignee: INTUIT INC., Mountain View, CA (US)

( * ) Notice: Subject to any disclaimer, the term of this patent is extended or adjusted under 35 U.S.C. 154(b) by 735 days.

This patent is subject to a terminal disclaimer.

(21) Appl. No.: 13/012,098

(22) Filed: Jan. 24, 2011

(51) Int. Cl.
*G06F 17/21* (2006.01)
*G06Q 40/00* (2012.01)
*G06F 17/27* (2006.01)
*G06F 17/28* (2006.01)
*G06K 9/00* (2006.01)

(52) U.S. Cl.
CPC ...................................... *G06Q 40/10* (2013.01)

(58) Field of Classification Search
CPC ............ G06Q 40/123; G06F 17/30495; G06F 17/30985; G06F 17/243; G06F 17/30722; G06F 17/27; G06F 17/218; G06F 17/2745; G06F 17/2785; G06F 17/30011; G06F 17/30038; G06F 17/3053; G06F 17/30707; G06K 9/72; G06K 9/00442; G06K 9/00
See application file for complete search history.

(56) References Cited

U.S. PATENT DOCUMENTS

| 5,680,511 | A | * | 10/1997 | Baker | ................ | G10L 15/1815 704/257 |
| H001830 | H | * | 1/2000 | Petrimoulx | ............ | G06Q 40/02 705/30 |
| 6,199,034 | B1 | * | 3/2001 | Wical | ................. | G06F 17/2785 704/9 |
| 6,577,755 | B1 | * | 6/2003 | Lorie | .................... | G06K 9/726 382/140 |
| 6,598,046 | B1 | * | 7/2003 | Goldberg | .......... | G06F 17/30699 |
| 6,651,218 | B1 | * | 11/2003 | Adler | ...................... | G06F 17/27 707/999.001 |
| 7,542,958 | B1 | * | 6/2009 | Warren | ............... | G06F 17/3089 706/48 |

(Continued)

*Primary Examiner* — Ryan Zeender
*Assistant Examiner* — Dana Amsdell
(74) *Attorney, Agent, or Firm* — Patterson & Sheridan, LLP

(57) ABSTRACT

The disclosed embodiments relate to a tax-information assembly technique, which extracts tax information and associated context information from income-tax documents, where these income-tax documents are associated with an income-tax agency, and some of the income-tax documents include the same tax information in different document formats. During this technique, semantic and structural heuristics are used to identify tax phrases in the extracted tax information. Moreover, additional tax phrases in the extracted tax information are identified using a statistical identification technique. Next, relationships between the tax phrases and the additional tax phrases are determined, and the context information is used to consolidate the tax phrases and the additional tax phrases into a tax-information data structure.

19 Claims, 7 Drawing Sheets

(56) References Cited

U.S. PATENT DOCUMENTS

| | | | |
|---|---|---|---|
| 7,697,791 B1* | 4/2010 | Chan | G06Q 30/0263 382/305 |
| 8,589,262 B1* | 11/2013 | Wang | G06F 17/27 382/137 |
| 8,707,157 B1* | 4/2014 | Chouhan | G06F 17/243 715/222 |
| 2002/0156817 A1* | 10/2002 | Lemus | G06F 17/30569 715/256 |
| 2004/0013302 A1* | 1/2004 | Ma | G06K 9/00463 382/209 |
| 2006/0010435 A1* | 1/2006 | Jhanwar et al. | 717/168 |
| 2006/0041484 A1* | 2/2006 | King | G06F 17/243 705/26.81 |
| 2006/0041538 A1* | 2/2006 | King | H04N 1/00244 |
| 2006/0098900 A1* | 5/2006 | King | G06F 21/606 382/305 |
| 2006/0242194 A1* | 10/2006 | Tsyganskiy et al. | 707/103 R |
| 2006/0253418 A1* | 11/2006 | Charnock | G06F 17/30716 |
| 2006/0271451 A1* | 11/2006 | Varughese | G06F 17/243 705/31 |
| 2007/0250418 A1* | 10/2007 | Banks | G06Q 40/02 705/31 |
| 2007/0255634 A1* | 11/2007 | Alley | G06Q 10/00 705/35 |
| 2008/0235207 A1* | 9/2008 | Berkner | G06F 17/30554 |
| 2009/0171955 A1* | 7/2009 | Merz | G06F 17/30495 |
| 2010/0179962 A1* | 7/2010 | Schuster | G06F 17/243 707/769 |
| 2011/0029443 A1* | 2/2011 | King | G06K 9/228 705/310 |
| 2011/0033080 A1* | 2/2011 | King | G06K 9/00 382/100 |
| 2011/0131157 A1* | 6/2011 | Iyer | G06Q 30/0251 706/12 |
| 2012/0117082 A1* | 5/2012 | Koperda | G06F 17/3053 707/748 |

* cited by examiner

ASSEMBLING A TAX-INFORMATION DATA STRUCTURE

CROSS REFERENCE TO RELATED APPLICATIONS

This application is also related to co-pending U.S. patent application Ser. No. 13/004,602, by Gang Wang, filed on Jan. 11, 2011, entitled "Technique for Computing Relevancy Between Tax Information," and to co-pending U.S. patent application Ser. No. 12/948,440, by Gang Wang, filed on Nov. 17, 2010, entitled "Content-Dependent Processing of Questions and Answers," the contents of each of which are herein incorporated by reference.

BACKGROUND

The present disclosure relates to techniques for assembling a tax-information data structure.

A number of companies presently provide software to facilitate accounting and income-tax preparation services. For example, Intuit, Inc. (of Mountain View, Calif.) presently provides income-tax preparation software to millions of individuals and businesses. This software is centered on a so-called "tax engine" that encodes tax knowledge, such as tax-related logic and associated calculations. In order to both accumulate and refresh this tax knowledge, a large group of income-tax experts reviews hundreds of official income-tax documents (including tax forms, instructions, publications, etc.) every year. These income-tax documents include thousands of pages and millions of words. Consequently, reviewing these income-tax documents is an extremely cumbersome, time-consuming and expensive manual process, which significantly increases software-development expense.

Furthermore, the manual review of the income-tax documents is prone to error and typically results in a quasistatic tax engine, i.e., the tax engine is only updated infrequently, such as once a year. Because the tax engine is quasistatic, it is often difficult to provide value-added services, especially in dynamic environments (such as online), or to adapt the income-tax software to changing customer needs. These limitations can degrade the customer experience, and thus can adversely impact customer retention and profitability.

SUMMARY

The disclosed embodiments relate to a computer system that facilitates assembling a tax-information data structure. During operation, the computer system extracts tax information and associated context information from income-tax documents. These income-tax documents are associated with an income-tax agency, and some of the income-tax documents include the same tax information in different document formats. Next, the computer system uses semantic and structural heuristics to identify tax phrases in the extracted tax information. Moreover, the computer system identifies additional tax phrases in the extracted tax information using a statistical identification technique. Next, the computer system determines relationships between the tax phrases and the additional tax phrases, and uses the context information to consolidate the tax phrases and the additional tax phrases into the tax-information data structure.

Note that the income-tax documents may include income-tax forms and income-tax guides.

Furthermore, the context information may include locations associated with the extracted tax information in the income-tax documents. For example, the locations may include: a page in an income-tax document, a worksheet associated with the income-tax document, and/or lines in the worksheet. In some embodiments, the context information is determined by comparing the same tax information in the different document formats.

Additionally, the semantic and structural heuristics may operate on Extensible Markup Language (XML) tags in the income-tax documents. Alternatively or additionally, using the semantic and structural heuristics may involve natural language processing of words in headers in the income-tax documents.

In some embodiments, identifying the additional tax phrases involves: comparing phrases in a language model associated with the income-tax documents to phrases in another language model associated with a topic other than income tax, and excluding phrases that are common to the language model and the other language model. For example, the phrases in the language model may be generated using N-gram processing of the extracted information.

In some embodiments, prior to extracting the tax information, the computer system collects the income-tax documents from multiple sources. Furthermore, prior to using the semantic and structural heuristics, the computer system may segment the extracted tax information based on: sentences in the income-tax documents, layouts of the income-tax documents, and/or an index associated with the income-tax documents.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for assembling a tax-information data structure, and a computer-program product (e.g., software) for use with the computer system are described. During this assembly technique, tax information and associated context information are extracted from income-tax documents. These income-tax documents are associated with an income-tax agency, and some of the income-tax documents include the same tax information in different document formats. Then, semantic and structural heuristics are used to identify tax phrases in the extracted tax information. Moreover, additional tax phrases in the extracted tax information are identified using a statistical identification technique. Next, relationships between the tax phrases and the additional tax phrases are determined, and the context information is used to consolidate the tax phrases and the additional tax phrases into the tax-information data structure.

By assembling the tax-information data structure, this assembly technique facilitates continuous or periodic accumulation and refreshing of tax knowledge. As a consequence, the resulting tax-information data structure is more accurate and up-to-date than tax engines that are generated by groups of income-tax experts. Therefore, the assembly technique may reduce the cost of developing and maintaining the tax-information data structure, and in the process may facilitate improved value-added services for users of income-tax software. Thus, the assembly technique may improve the customer experience, as well as customer retention and the profitability of a provider of financial software (such as a provider of income-tax software that leverages the tax-information data structure).

In the discussion that follows, the user may include one of a variety of entities, such as: an individual (for example, an existing customer, a new customer, a service provider, an income-tax professional, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

We now describe embodiments of the assembly technique. This assembly technique extracts tax phrases and tax concepts (which incorporate multiple tax phrases) from government income-tax documents using text-mining techniques, and calculates the relevance or statistical relationships between tax phrases and/or tax concepts. In the process, the assembly technique can greatly enhance the tax knowledge that underlies financial software, such as income-tax software. Furthermore, by using ontology-driven knowledge (instead of a procedural programming language) the resulting tax-information data structure may be flexible or dynamic, thereby enabling valuable customer-facing features (such as a concept-based income-tax-document navigation system).

Figure 1:
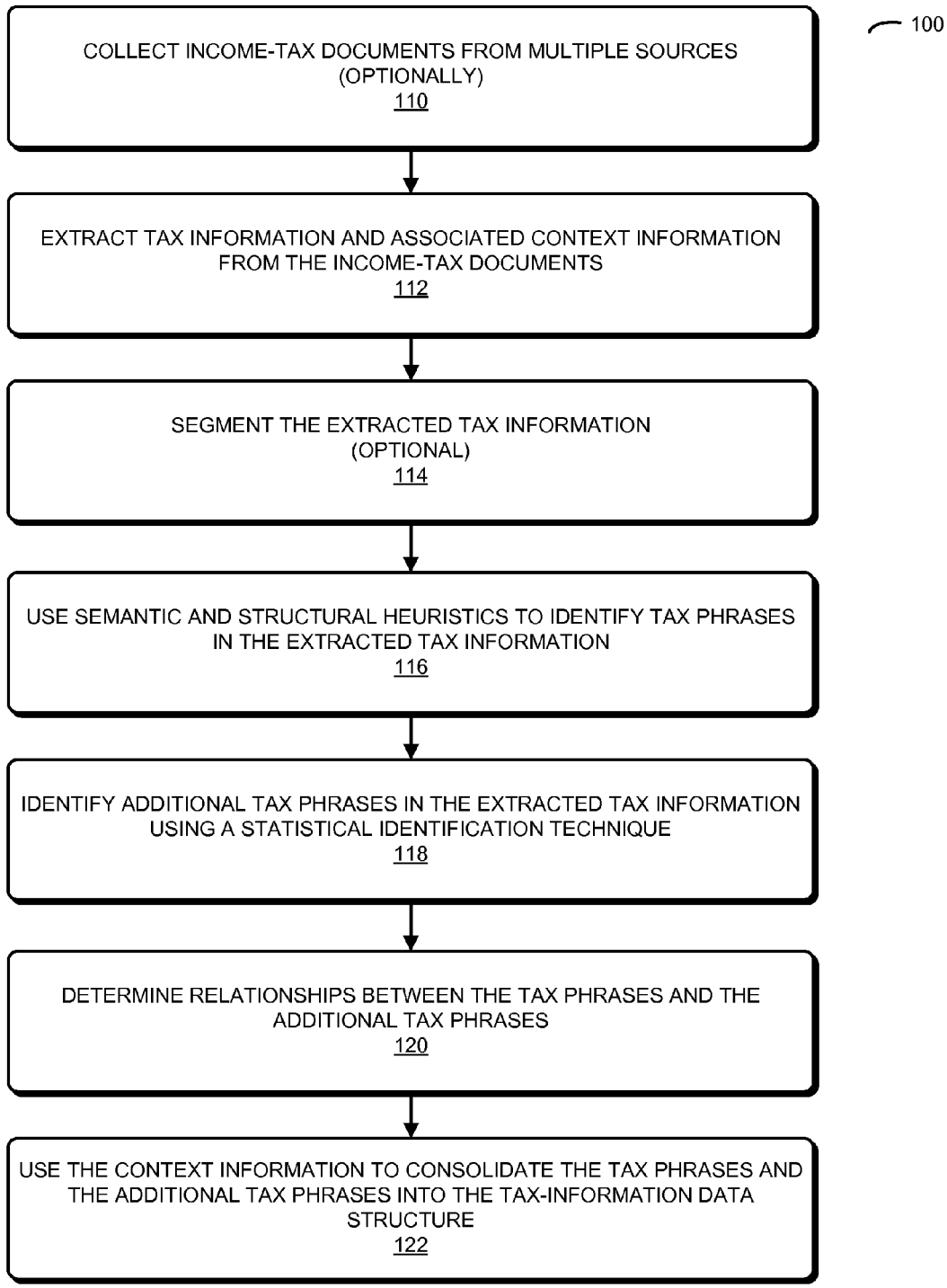
FIG. 1 is a flow chart illustrating a method for assembling a tax-information data structure in accordance with an embodiment of the present disclosure.
Figure 6:
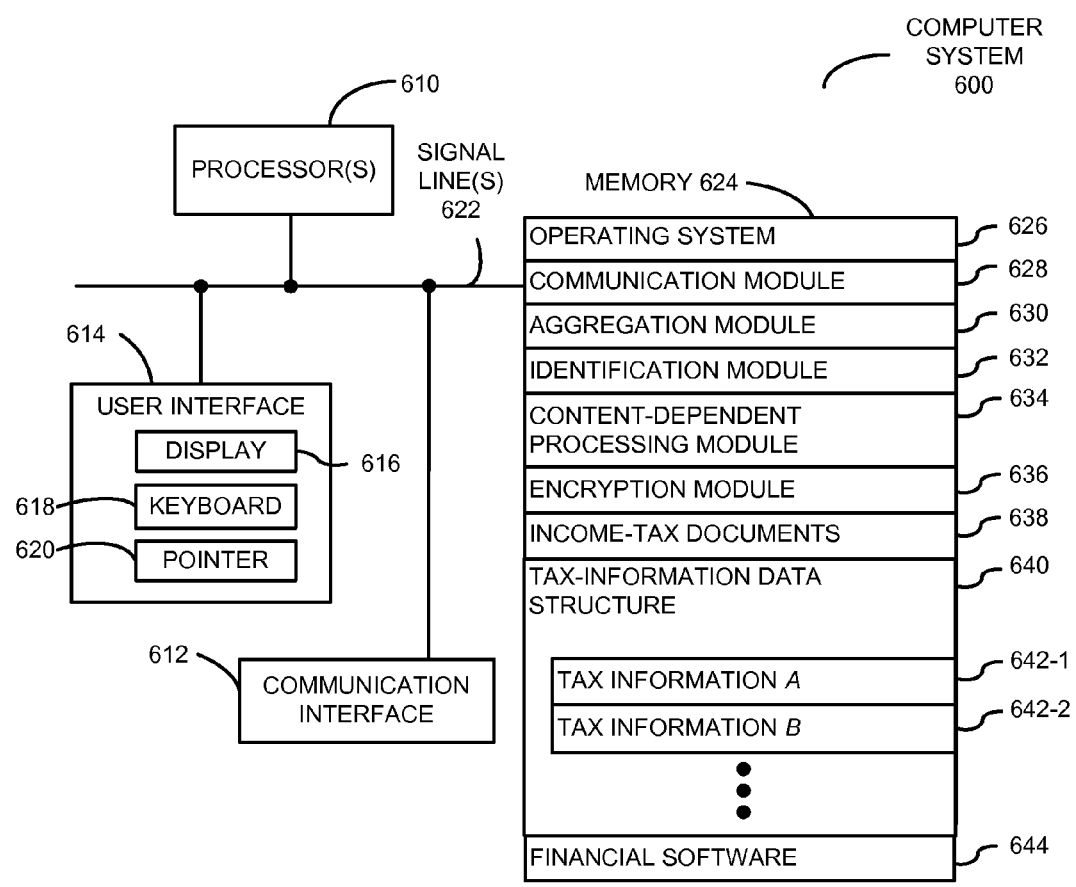
FIG. 6 is a block diagram illustrating a computer system that performs the methods of FIGS. 1-3 in accordance with an embodiment of the present disclosure.

FIG. 1 presents a flow chart illustrating a method 100 for assembling a tax-information data structure, which may be performed by computer system 600 (FIG. 6). During operation, the computer system extracts tax information (such as text) and associated context information from income-tax documents (operation 112). These income-tax documents are associated with an income-tax agency, and some of the income-tax documents include the same tax information in different document formats. For example, the income-tax documents may include: income-tax forms, income-tax guides, income-tax instructions, income-tax publications, income-tax notices, etc.

Furthermore, the context information may include locations associated with the extracted tax information in the income-tax documents. For example, the locations may include: a page in an income-tax document, a worksheet associated with the income-tax document, and/or lines in the worksheet. In some embodiments, the context information is determined by comparing the same tax information in the different document formats, such as Adobe Acrobat® (provided by Adobe Systems, Inc. of San Jose Calif.) and an Extensible Markup Language (XML) format.

In particular, the tax information may be extracted using text-cleaning and feature-extraction techniques. During these techniques, the content of the documents is regulated and related metadata may be generated, such as: the title or version of the income-tax document, the page number where the tax information is extracted, the page index, an associated worksheet, the lines in the worksheet, text associated with an XML tag, associated income-tax forms, etc.

Then, the computer system uses semantic and structural heuristics to identify tax phrases (such as 'qualified widowers,' 'alternative minimum tax,' etc.) in the extracted tax information (operation 116). For example, the semantic and structural heuristics may operate on or use XML tags in the income-tax documents, such as part of a speech tag or a named entity. For example, the XML tags may constitute a nested tree structure, where each node in the tree can have daughters or children, and where each node has an associated tag. These tags may embed index words that indicate the importance of associated text. In some embodiments, structural heuristics can include how and where the text is presented in the income-tax documents, for example, if a phrase is in italics, or a section header (such as a 'definition' XML tag), etc. Alternatively or additionally, using the semantic and structural heuristics may involve natural language processing or synthesis of words in headers (or titles) in the income-tax documents and/or predefined tax phrases and tax concepts in an income-tax dictionary.

Moreover, the computer system identifies additional tax phrases in the extracted tax information using a statistical identification technique (operation 118). In some embodiments, identifying the additional tax phrases involves: comparing phrases in a language model associated with the income-tax documents to phrases in another language model associated with a topic other than income tax (such as sports), and excluding phrases that are common to the language model and the other language model. For example, after eliminating so-called stop words or phrases, the phrases in the language model may be generated using N-gram (such as two- or three-word) processing of the extracted information. In this way, domain-specific tax phrases and/or tax concepts can be identified.

Next, the computer system determines relationships between the tax phrases and the additional tax phrases (operation 120), and uses the context information to consolidate the tax phrases and the additional tax phrases into the tax-information data structure (operation 122). For example, tax phrases and tax concepts identified in operations 116 and 118, along with their indexing information (such as the context information or metadata) may be used to consolidate the tax phrases into tax-concept trees, such as 'property income' and 'farming and fishing income,' both of which belong to the coarser concept of 'income.' In an exemplary embodiment, the resulting tax-information data structure may include 10,000 tax phrases.

In some embodiments, prior to extracting the tax information, the computer system optionally collects the income-tax documents from multiple sources (operation 110), such as 400 Internal Revenue Service income-tax documents. For example, there may be millions of words in the income-tax documents published by the government. Moreover, these income-tax documents are often delivered in Adobe Acrobat® format, XML, Standard Generalized Markup Language (SGML), text, a marker-language format or another format. The assembly technique may be able to accommodate multiple formats and, as noted previously, may be able to use the different formats to extract tax information.

Furthermore, prior to using the semantic and structural heuristics, the computer system may optionally segment the extracted tax information (operation 114) into various hierarchical layers based on fine-level segmentation (such as sentences in the income-tax documents) and coarse-level segmentation. For example, coarse-level segmentation may be based on: sections or subsections in the income-tax documents, visual layouts of the income-tax documents, tables, figures, appendices, page boundaries, and/or an index of tax phrases or tax concepts associated with the income-tax documents. In addition, during this operation, indices may be developed (such as work-level indexing) to facilitate further processing.

In an exemplary embodiment, the assembly technique is used to extract tax knowledge from the income-tax documents. In this technique, the income-tax documents may be viewed as an integral collection in order to find or identify tax-concept-level connections or relationships. This computer-implemented process may use text-mining and knowledge-management techniques. In the process, the assembly technique may create a set of tools and knowledge bases (such as the tax-information data structure) to enhance internal productivity and to enable valuable new offerings/features based on the accumulated tax-domain knowledge.

Note that the income-tax documents may encompass different tax entities or tax concepts. Therefore, processing or interpreting the information in the income-tax documents may leverage tax-domain-specific knowledge. For example, a worksheet in an income-tax document may utilize inputs from one or more other income-tax forms and may provide outputs to one or more additional income-tax forms. Therefore, interpreting the tax information (such as the tax phrases and tax concepts) embodied in this worksheet may be facilitated by context information, such as: which income-tax form the worksheet is associated with, which line(s) in the income-tax form it is associated with, etc. This context or 'location' information may be included in metadata that is associated with the content in the worksheet (such as the inputs to the worksheet and the outputs from the worksheet) in the tax-information data structure. Furthermore, semantic indexing, such as statistical relationships, between the tax phrases and tax concepts that are extracted may also be included in the tax-information data structure, thereby facilitating additional services (which are described further below with reference to FIGS. 2-4).

As noted previously, the tax-information data structure may be used to provide enhanced services. For example, the interrelationships between the tax phrases and tax concepts (such as 'capital gain' and 'form 1099,' sale of business property' and 'earned income credit'), which are determined using the tax-information data structure, may be used to assist users in cross-navigating the tax phrases and tax concepts. This capability may be useful when performing income-tax calculations and, more generally, in managing tax knowledge.

Figure 2:
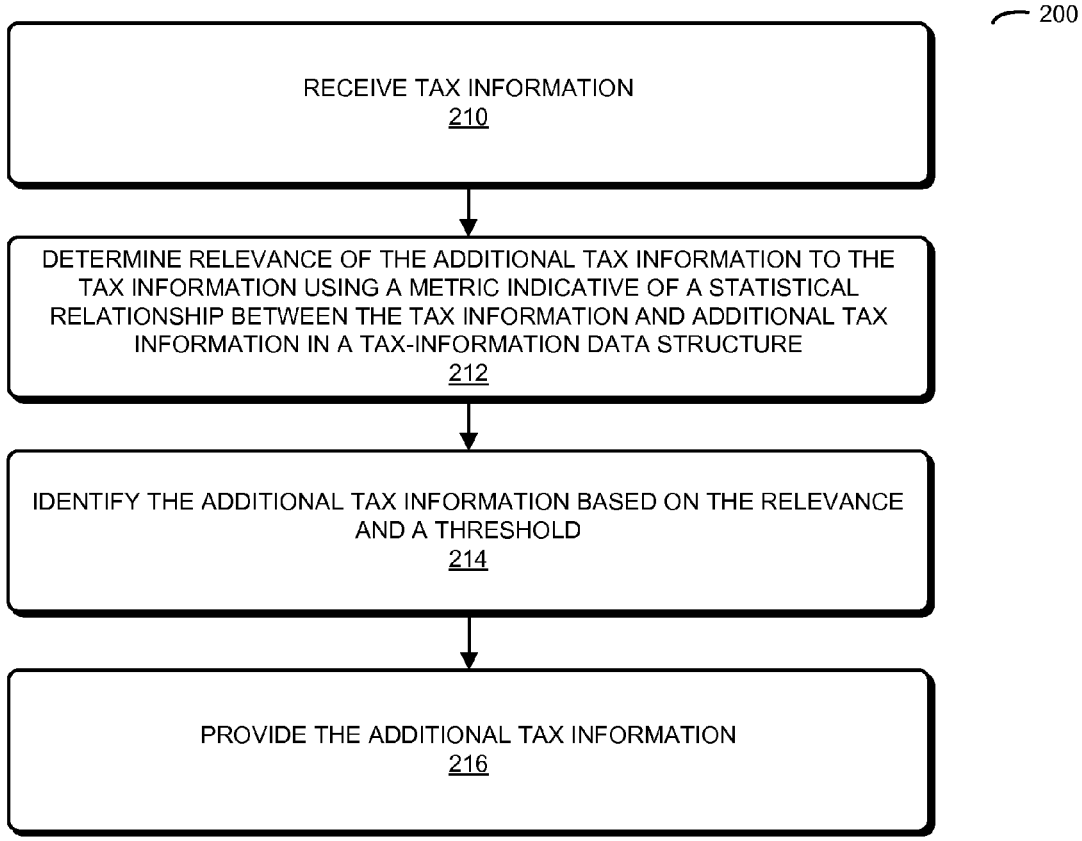
FIG. 2 is a flow chart illustrating a method for identifying and providing additional tax information in accordance with an embodiment of the present disclosure.

FIG. 2 presents a flow chart illustrating a method 200 for identifying and providing additional tax information, and which may be performed by computer system 600 (FIG. 6). During operation, the computer system receives tax information (operation 210). For example, a user may browse an income-tax document and may highlight a particular tax phrase. Then, the computer system determines relevance of the additional tax information to the tax information using a metric indicative of a statistical relationship between the tax information and additional tax information in a tax-information data structure (operation 212). This metric is based on co-existence of the tax information and the additional tax information at different hierarchical levels in income-tax documents (such as income-tax forms and income-tax guides). Furthermore, the tax-information data structure includes tax information and associated context information from income-tax documents. For example, the context information may include locations associated with the tax information in the income-tax documents, such as: a page in an income-tax document, a worksheet associated with the income-tax document, and/or lines in the worksheet.

In some embodiments, determining the relevance involves a weighted sum of contributions associated with the co-existence of the tax information and the additional tax information at the different hierarchical levels in income-tax documents (which may be indicated by the context or metadata in the tax-information data structure). Note that the hierarchical levels in a given income-tax document may include: sentence-level co-existence, paragraph-level co-existence, section-level co-existence, and/or co-existence in a worksheet.

For example, method 200 can be used to compute the relevance of two tax phrases (or tax concepts) c1 and c2 based on their indexing (e.g., location or metadata) information. Thus, there may be different weights in the weighted sum if c1 and c2 occur in the same sentence, the same paragraph, the same table and/or the same section of one or more income-tax documents. (In general, the further away or the larger the distance between c1 and c2, the lower the weight.) Each instance of the aforementioned co-existences may provide information as to how 'closely' c1 and c2 are related, and therefore can provide a quantitative measure of the relevance between c1 and c2.

Furthermore, the additional tax information may include a tax concept that incorporates the tax information. For example, the additional tax information may include an income-tax topic (such as the 'alternative minimum tax' and 'itemized deduction'). Additionally, the additional tax information may provide a variety of content, such as: a location with additional information associated with the tax information (such as a hyperlink) and/or help content associated with the tax information.

Next, the computer system identifies the additional tax information based on the relevance and a threshold (operation 214), and the computer system provides the additional tax information (operation 216). Thus, by leveraging the tax-information data structure, method 200 may provide concept-based navigation to the additional tax information, which is semantics-sensitive (instead of being text-based). For example, if the user highlights or clicks on 'alternative minimum tax' in an income-tax document, method 200 may be used to provide the locations of additional references that are relevant to the 'alternative minimum tax.' Alternatively or additionally, method 200 may be used to determine the statistical association between the tax concepts of 'foreclosure' and 'housing,' or 'income' and 'wages' or 'tips.'

Note that, in some embodiments, the tax concepts and relevancies in the tax-information data structure may be combined into a non-directional weighted graph. In this graph, a given node may include a tax concept, and the arcs between the nodes in conjunction with the associated weights may indicate the relevancy of the nodes to each other (even if they are not directly linked). Thus, the relevancy metrics (or weights) may imply hierarchical relationships between tax phrases and/or tax concepts in the tax-information data structure.

Figure 3:
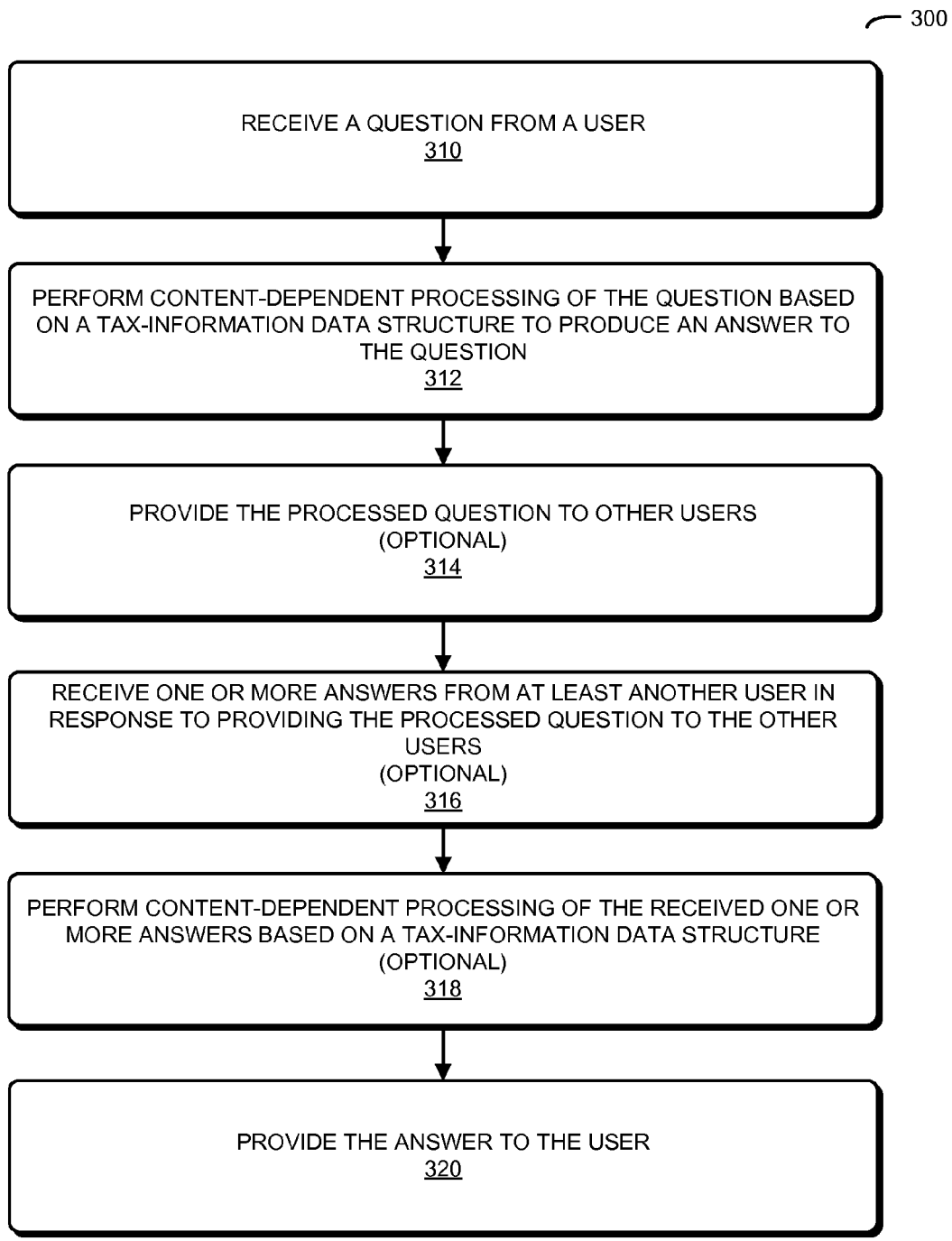
FIG. 3 is a flow chart illustrating a method for providing an answer to a question in accordance with an embodiment of the present disclosure.

More generally, the tax-information data structure may be used to assist users in answering income-tax questions and/or to solve related problems, for example, when users are interacting with each other via an income-tax forum. This is shown in FIG. 3, which presents a flow chart illustrating a method 300 for providing an answer to a question, and which may be performed by computer system 600 (FIG. 6). During operation, the computer system receives the question from a user (operation 310), where the question is related to income taxes. For example, the question may be received from a user of an income-tax forum. (However, the question may be received from the user using a wide variety of communication techniques and in a host of information documents or environments.)

Then, the computer system performs content-dependent processing of the question based on the tax-information data structure to produce the answer to the question (operation 312). Note that the tax-information data structure includes: tax phrases, context information associated with the tax phrases, tax concepts that encompass multiple tax phrases, and/or statistical association metrics between the tax phrases and the tax concepts. For example, the context information (or metadata) may include locations in income-tax documents where the tax phrases were extracted.

As described previously in the context of FIG. 2, in some embodiments a given statistical association metric may be based on co-existence of one or more tax phrases and/or one or more tax concepts at different hierarchical levels in income-tax documents. For example, the given statistical association metric may be calculated using a weighted sum of contributions associated with the co-existence of the one or more tax phrases and/or the one or more tax concepts at the different hierarchical levels in income-tax documents. Note that the hierarchical levels in a given income-tax document may include: sentence-level co-existence, paragraph-level co-existence, section-level co-existence, and/or co-existence in a worksheet.

In some embodiments, the content-dependent processing involves: replacing user-specific terminology in the question with standardized terminology (e.g. jargon may be removed so that the question is more understandable to other users in a community); providing a location where information related to the question can be obtained (such as a telephone number of the Internal Revenue Service); and/or combining the question and another question (thereby reducing the number of questions to be answered). For example, prior to the combining, the computer system may determine a metric for a relationship between the question and the other question, and the combining of the question and the other question may be based on the determined metric. Note that the metric may be based on one or more of the statistical association metrics.

Next, the computer system provides the answer to the user (operation 320). For example, the answer may be provided to the user via the income-tax forum. (However, once again, the answer may be provided to the user using a wide variety of communication techniques and in a host of information documents or environments.)

In some embodiments, after the content-dependent processing, the computer system optionally provides the processed question to other users (operation 314). Moreover, the computer system may optionally receive one or more answers from at least another user in response to providing the processed question (operation 316), where the answer to the question provided to the user is at least one of the one or more received answers. Then, after receiving the one or more answers and prior to providing the answer to the user, the computer system may optionally perform content-dependent processing of the one or more received answers based on the tax-information data structure (operation 318). In this way, a community of users may assist the user by providing the answer, and the tax-information data structure may be used to appropriately process the answer before it is provided to the user (operation 320).

Figure 4:
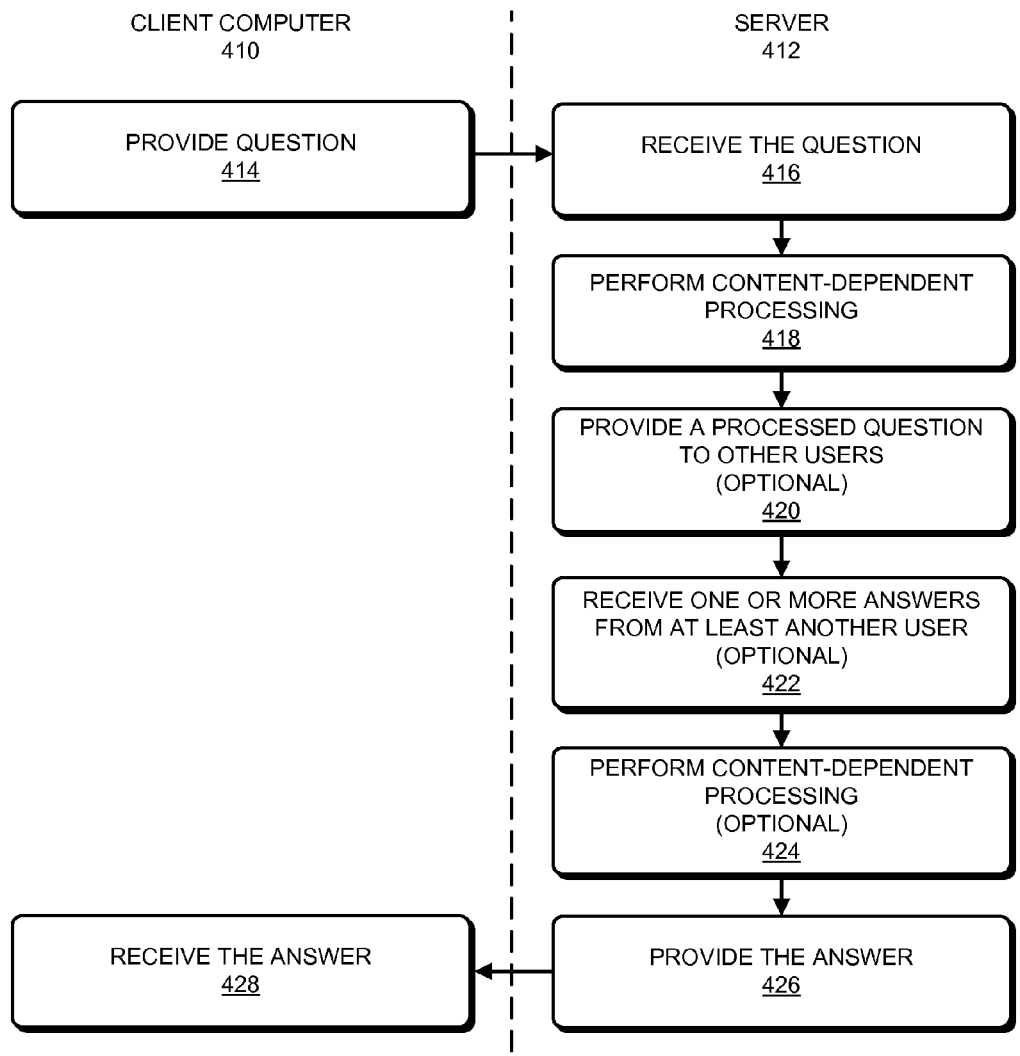
FIG. 4 is a flow chart illustrating the method of FIG. 3 in accordance with an embodiment of the present disclosure.

In an exemplary embodiment, the technique for providing the answer to the question is implemented using one or more client computers and at least one server computer, which communicate through a network, such as the Internet (i.e., using a client-server architecture). This is illustrated in FIG. 4, which presents a flow chart illustrating method 300 (FIG. 3). During this method, a user of a client computer 410 provides a question (operation 414). This question is received (operation 416) by server 412. Server 412 performs content-dependent processing on the question (operation 418) and may provide the answer (operation 426), which is received by client computer 410 (operation 428).

In some embodiments, server 412 leverages a community of users to determine and/or provide the answer. For example, server 412 may optionally provide the processed question to other users (operation 420). Subsequently, server 412 may optionally receive one or more answers from at least another user (operation 422). Next, server 412 may optionally perform content-dependent processing on the question (424), and the answer provided to the user (operation 428) may be one of the processed answers.

For example, the user may ask "when do I use itemized deductions?" Another user in the community may answer "when you fall under the AMT." The user may then query "what is the AMT?" In this case, server 412 may provide a hyperlink defining AMT so that the user does not have to wait for an answer from other users in the community.

In an exemplary embodiment, method 300 (FIG. 3) is used to enhance user contributions in an income-tax question-and-answer service or forum using the tax-information data structure. In particular, in existing income-tax question-and-answer services or forums the contributed answers are often provided to the community of users as raw text with very little enhancement. The availability of the tax-information data structure (which includes rich content mined from income-tax documents) can improve the quality of the answers, as well as the overall discourse in the community.

For example, suppose the answer to a user's question is: For your situation, you need to file the alternative minimum tax, and how to figure it out is in worksheet XYZ. Using the tax-information data structure, server 412 can associate a hyperlink with the phrases 'alternative minimum tax' and 'worksheet XYZ.' Then, a user in the community can activate one of these hyperlinks (for example, by clicking on it using a mouse) to find more information. In particular, the user may be advised that the abbreviation of 'alternative minimum tax' is AMT, as well as its definition. Thus, the tax-information data structure can be leveraged to provide added value to user contributions, thereby improving the quality of the content in the income-tax question-and-answer service or forum, and making the content more dynamic and interactive (such as facilitating on-the-fly hyperlink generation and content-dependent enhancement).

Note that to facilitate method 300 (FIG. 3), in the tax-information data structure, tax concepts may be associated with one or more tax phrases, and these tax phrases may be reverse indexed to associate back to the tax concepts. Then, metadata associated with the tax concept (such as the definition of the tax concept) can be queried by providing the tax phrase. In this way, the extracted information in the tax-information data structure can be used to enhance one or more user contributions in a live community (such as an online forum).

While the preceding example used an income-tax question-and-answer service or forum, method 300 (FIG. 3) may be applied broadly to a wide variety of live communities in which users ask questions and/or provide content. Thus, the question-and-answer service or forum may not be income-tax specific. More generally, this approach may be applied to small-business forums, healthcare, and/or a product that has an associated domain which can be used to create content-dependent processing or questions and/or answers.

In some embodiments of methods 100 (FIG. 1), 200 (FIG. 2) and/or 300 there may be additional or fewer operations. Moreover, the order of the operations may be changed, and/or two or more operations may be combined into a single operation.

Figure 5:
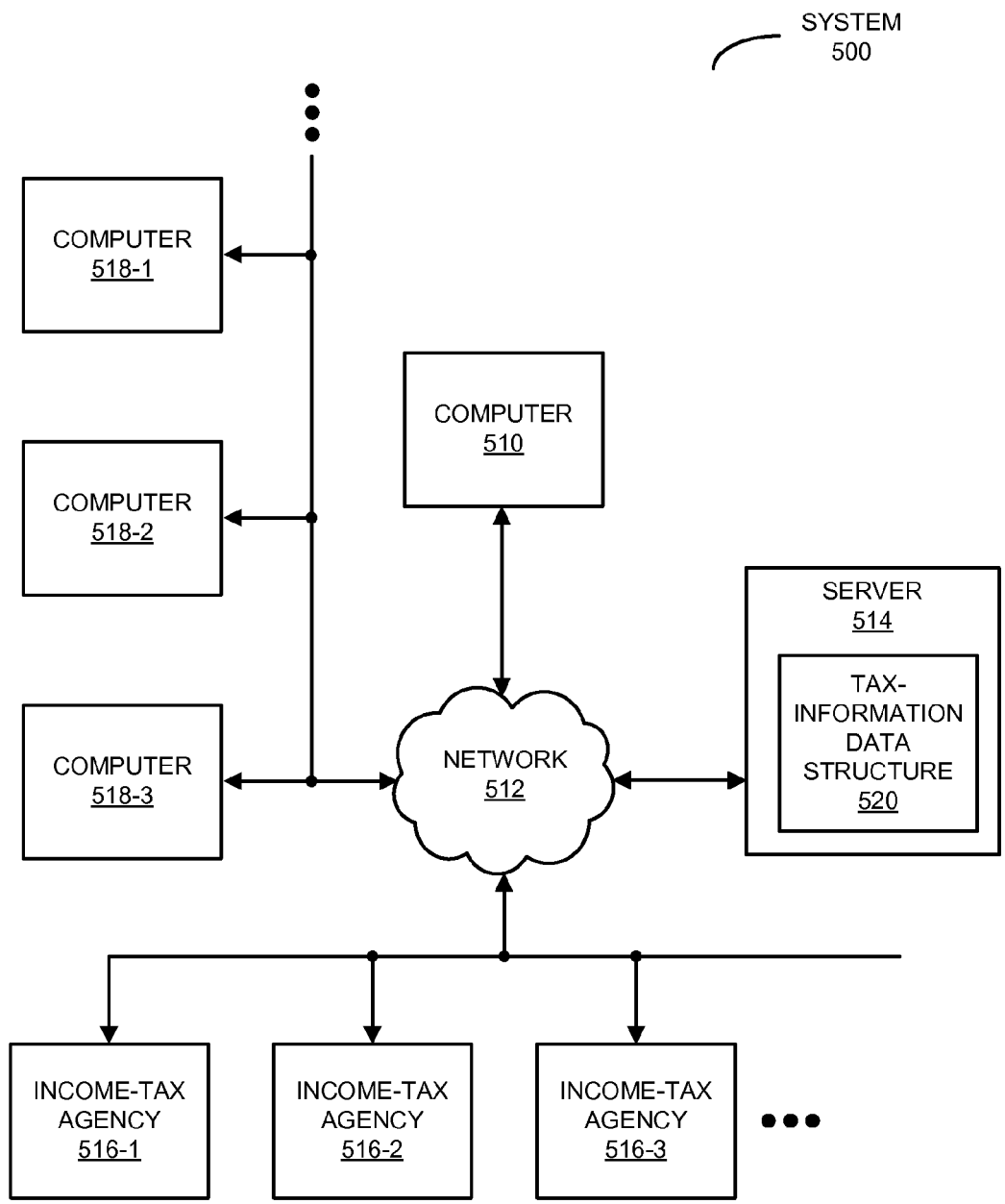
FIG. 5 is a block diagram illustrating a computer system that performs the methods of FIGS. 1-3 in accordance with an embodiment of the present disclosure.

We now describe embodiments of the computer system and its use. FIG. 5 presents a block diagram illustrating a system 500 that performs methods 100 (FIG. 1), 200 (FIG. 2) and/or 300 (FIG. 3). In this system, server 514 may collect income-tax documents from income-tax agencies 516 via network 512. Then, as described previously in the context of FIG. 1, server 514 may assemble tax-information data structure 520 from the collected income-tax documents.

Subsequently, a user of computer 510 may use financial software, such as income-tax software. For example, the user may interact with a web page that is provided by server 514 via network 512, and which is rendered by a web browser on computer 510. Alternatively, the user may use a financial software application that is resident on and that executes on computer 510. This financial software application may be a stand-alone application or a portion of another application that is resident on and which executes on computer 510 (such as financial software that is provided by server 514 or that is installed and which executes on computer 510).

In some embodiments, at least a portion of the financial software application may be an application tool (such as a financial software application tool) that is embedded in the web page (and which executes in a virtual environment of the web browser). Thus, the financial software application tool may be provided to the user via a client-server architecture.

As discussed previously in the context of FIG. 2, the user may highlight or access a tax phrase or tax concept in the financial software. For example, the user may highlight a tax phrase (using a mouse) in an income-tax form that is embedded in a web page. Using tax-information data structure 520, the relevancy of additional tax information to the highlighted tax phrase may be determined and the additional tax information may be identified. Then, the additional tax information may be provided by server 514 to computer 510 via network 512, and the additional tax information may be displayed by the financial software.

Furthermore, in some embodiments, a community of users (who are using computers 518) may interact in an online forum via network 512. These users may exchange questions and answers about a topic or a domain, such as income taxes. As described previously in the context of FIGS. 3 and 4, server 514 may perform content-dependent processing of the questions and/or the answers based on tax-information data structure 520, thereby improving the quality of the content in the online forum and making the content more dynamic and interactive.

Note that information in system 500 may be stored at one or more locations in system 500 (i.e., locally or remotely). Moreover, because this data may be sensitive in nature, it may be encrypted. For example, stored data and/or data communicated via network 512 may be encrypted.

FIG. 6 presents a block diagram illustrating a computer system 600 that performs methods 100 (FIG. 1), 200 (FIG. 2) and/or 300 (FIG. 3). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: aggregation module 630 (or a set of instructions), identification module 632 (or a set of instructions), content-dependent processing module 634 (or a set of instructions), encryption module 636 (or a set of instructions) and/or financial software 644 (or a set of instructions). Note that one or more of these program modules (or sets of instructions) may constitute a computer-program mechanism.

Figure 7:
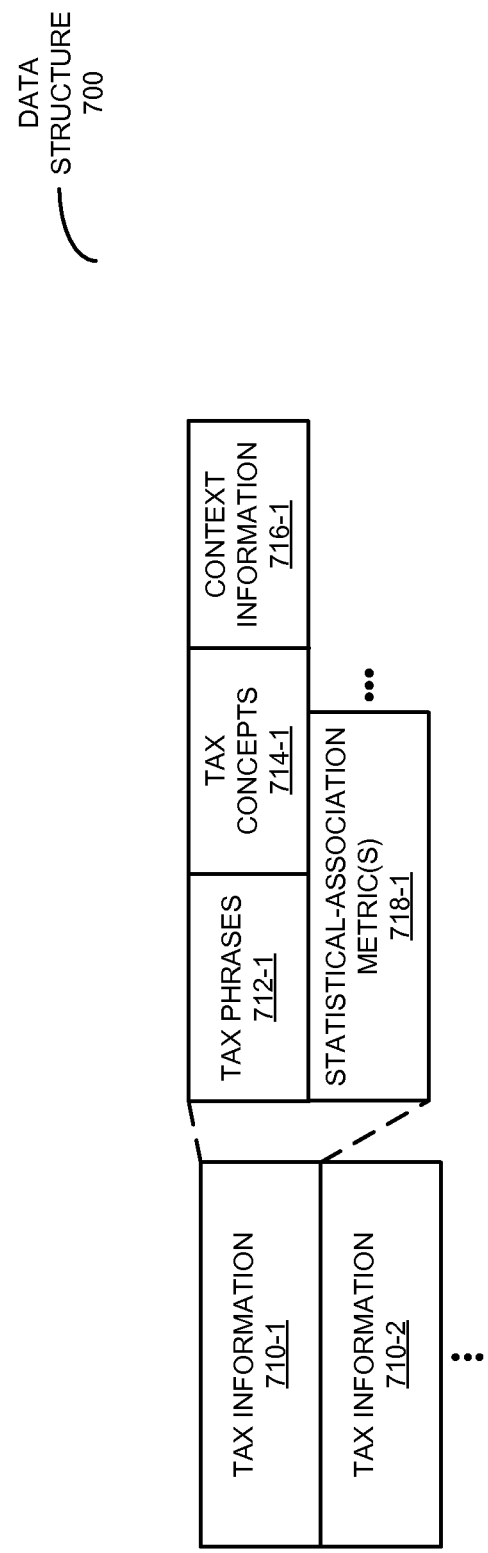
FIG. 7 is a block diagram illustrating a data structure for use in the computer system of FIG. 6 in accordance with an embodiment of the present disclosure.

During operation, aggregation module 630 may collect income-tax documents 638 and may assemble tax-information data structure 640 (including tax information A 642-1 and tax information B 642-2) using semantic and structural heuristics, as well as a statistical identification technique. This tax-information data structure is shown in FIG. 7, which presents a block diagram illustrating a data structure 700. In particular, data structure 700 may include tax information 710. For example, tax information 710-1 may include: one or more tax phrases 712-1, one or more tax concepts 714-1, associated context information (such as locations in one or more income-tax documents or metadata) 716-1, and/or one or more statistical association metrics 718-1 between two or more of tax phrases 712-1 and/or tax concepts 714-1.

Referring back to FIG. 6, identification module 632 may leverage tax-information data structure 640 to identify additional tax information for a user, such as while a user is viewing an income-tax forum while using financial software 644. Furthermore, content-dependent processing module 634 may leverage tax-information data structure 640 to perform content-dependent processing of questions and/or answers from users in a community, such as an online income-tax forum.

Because information in memory 624 may be sensitive in nature, in some embodiments at least some of the data stored in memory 624 and/or at least some of the data communicated using communication module 628 is encrypted using encryption module 636. Additionally, in some embodiments one or more of the modules in memory 624 may be included in financial software 644.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors 610.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 may be implemented in one or more application-specific integrated circuits (ASICs) and/or one or more digital signal processors (DSPs).

Computers and servers in system 500 (FIG. 5) and/or computer system 600 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 512 (FIG. 5) may include: the Internet, World Wide Web, an intranet, LAN, WAN, MAN, or a combination of networks, or other technology enabling communication between computing systems.

In exemplary embodiments, the financial-software application (i.e., financial software 644) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

System 500 (FIG. 5), computer system 600 (FIG. 6) and/or data structure 700 may include fewer components or additional components. Moreover, two or more components may be combined into a single component, and/or a position of one or more components may be changed. In some embodiments, the functionality of system 500 (FIG. 5) and/or computer system 600 may be implemented more in hardware and less in software, or less in hardware and more in software, as is known in the art.

While the preceding discussion illustrated the use of the methods 100 (FIG. 1), 200 (FIG. 2), and 300 (FIGS. 3 and 4) in the context of income taxes, these techniques may be broadly applicable to a wide variety of topics or domains other than income tax (including small-business information, healthcare information, etc.), as well as applications other than income-tax software or forums. For example, the aforementioned techniques may be used in healthcare to assemble a healthcare-information data structure, and this healthcare-information data structure may be used to identify additional (relevant) healthcare information for users, as well as to perform content-dependent processing of questions and/or answers in a healthcare community (such as an online forum).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for assembling a tax-information data structure, comprising:

receiving a plurality of income-tax documents, wherein the documents comprise tax-forms, instructions, and publications issued by an income-tax authority to be used for subsequent income-tax preparation by users;

extracting, by a computer, information about taxes from the received income-tax documents, wherein the information about taxes comprises tax phrases;

extracting context information related to the extracted tax information, wherein the context information comprises location information associated with the extracted tax information, and wherein the location information comprises at least one of a title or version of an income-tax document, a page number in an income-tax document, and a page index associated with an income-tax document;

identifying a first set of tax phrases in the extracted tax information, wherein the identifying involves using semantic and structural heuristics;

identifying a second set of tax phrases in the extracted tax information using a statistical identification technique;

constructing, by the computer, the tax-information data structure, wherein the constructing involves building an association between the first and second sets of tax phrases with the extracted context information;

storing, in a memory of the computer, the constructed tax-information data structure;

receiving, at the computer, a tax-related query from a user, wherein the user is executing an income tax-preparation software;

processing the received query using the stored tax-information data structure to generate an answer; and
displaying the generated answer to the user.

2. The method of claim 1, wherein the location information further includes a worksheet associated with the income-tax document, and lines in the worksheet.

3. The method of claim 1, wherein some of the income-tax documents include the same tax information in different document formats; wherein the extracted context information is determined by comparing the same tax information in the different document formats.

4. The method of claim 1, wherein the semantic and structural heuristics operate on Extensible Markup Language (XML) tags in the income-tax documents.

5. The method of claim 1, wherein using the semantic and structural heuristics involve natural language processing of words in headers in the income-tax documents.

6. The method of claim 1, wherein identifying the second set of tax phrases involves:
comparing phrases in a language model associated with the income-tax documents to phrases in another language model associated with a topic other than income tax; and
excluding phrases that are common to the language model and the other language model.

7. The method of claim 6, wherein the phrases in the language model are generated using N-gram processing of the extracted information.

8. The method of claim 1, wherein, prior to receiving the income-tax documents, the method further involves collecting the income-tax documents from multiple sources.

9. The method of claim 1, wherein, prior to using the semantic and structural heuristics, the method further involves segmenting the extracted tax information based on at least one of sentences in the income-tax documents, layouts of the income-tax documents, and an index associated with the income-tax documents.

10. A non-transitory computer-program product for use in conjunction with a computer system, the computer-program product comprising a computer-readable storage medium and a computer-program mechanism embedded therein, to facilitate assembling a tax-information data structure, the computer-program mechanism including:
instructions for receiving a plurality of income-tax documents, wherein the documents comprise tax-forms, instructions, and publications issued by an income-tax authority to be used for subsequent income-tax preparation by users;
instructions for extracting tax information from the received income-tax documents, wherein the tax information comprises tax phrases;
instructions for extracting context information related to the extracted tax information, wherein the context information comprises location information associated with the extracted tax information, and wherein the location information comprises at least one of a title or version of an income-tax document, a page number in an income-tax document, and a page index associated with an income-tax document;
instructions for identifying a first set of tax phrases in the extracted tax information, wherein the identifying involves using semantic and structural heuristics;
instructions for identifying a second set of tax phrases in the extracted tax information using a statistical identification technique;
instructions for constructing, by the computer, the tax-information data structure, wherein the constructing involves building an association between the first and second sets of tax phrases with the extracted context information;
instructions for storing, in a memory of the computer, the constructed tax-information data structure;
instructions for receiving, at the computer, a tax-related query from a user, wherein the user is executing an income tax-preparation software;
instructions for processing the received query using the stored tax-information data structure to generate an answer; and
instructions for displaying the generated answer to the user.

11. The computer-program product of claim 10, wherein the location information further includes a worksheet associated with the income-tax document, and lines in the worksheet.

12. The computer-program product of claim 10, wherein some of the income-tax documents include the same tax information in different document formats; wherein the extracted context information is determined by comparing the same tax information in the different document formats.

13. The computer-program product of claim 10, wherein the semantic and structural heuristics operate on XML tags in the income-tax documents.

14. The computer-program product of claim 10, wherein using the semantic and structural heuristics involve natural language processing of words in headers in the income-tax documents.

15. The computer-program product of claim 10, wherein identifying the second set of tax phrases involves:
comparing phrases in a language model associated with the income-tax documents to phrases in another language model associated with a topic other than income tax; and
excluding phrases that are common to the language model and the other language model.

16. The computer-program product of claim 15, wherein the phrases in the language model are generated using N-gram processing of the extracted information.

17. The computer-program product of claim 10, wherein, prior receiving the income-tax, the computer-program mechanism further includes instructions for collecting the income-tax documents from multiple sources.

18. The computer-program product of claim 10, wherein, prior to the instructions for determining the semantic and structural heuristics, the computer-program mechanism further includes instructions for segmenting the extracted tax information based on at least one of sentences in the income-tax documents, layouts of the income-tax documents, and an index associated with the income-tax documents.

19. A computer system, comprising:
a processor;
memory; and
a program module, wherein the program module is stored in the memory and configurable to be executed by the processor to facilitate assembling a tax-information data structure, the program module including:
instructions for receiving a plurality of income-tax documents, wherein the documents comprise tax-forms, instructions, and publications issued by an income-tax authority to be used for subsequent income-tax preparation by users;
instructions for extracting tax information from the received income-tax documents, wherein the tax information comprises tax phrases;
instructions for extracting context information related to the extracted tax information, wherein the context information comprises location information associated with the extracted tax information, and wherein the location information comprises at least one of a title or version of an income-tax document, a page number in an income-tax document, and a page index associated with an income-tax document;

instructions for identifying a first set of tax phrases in the extracted tax information, wherein the identifying involves using semantic and structural heuristics;

instructions for identifying a second set of tax phrases in the extracted tax information using a statistical identification technique;

instructions for constructing, by the computer, the tax-information data structure, wherein the constructing involves building an association between the first and second sets of tax phrases with the extracted context information;

instructions for storing, in the memory, the constructed tax-information data structure;

instructions for receiving, at the computer, a tax-related query from a user, wherein the user is executing an income tax-preparation software;

instructions for processing the received query using the stored tax-information data structure to generate an answer; and instructions for displaying the generated answer to the user.

* * * * *